US012720519B2

(12) United States Patent
Ellenbeck et al.

(10) Patent No.: US 12,720,519 B2
(45) Date of Patent: Aug. 25, 2026

(54) RECEIVER-FIRST AND UE-FIRST BEAMFORMING IN SUB-TERAHERTZ COMMUNICATION

(71) Applicant: Apple Inc., Cupertino, CA (US)

(72) Inventors: Jan K Ellenbeck, Gruenwald (DE); Biljana Badic, Munich (DE); Christian Drewes, Germering (DE); Mikhail Wilhelm, Munich (DE); Stefan Meyer, Munich (DE); Norman Goris, Dortmund (DE)

(73) Assignee: Apple Inc., Cupertino, CA (US)

( * ) Notice: Subject to any disclaimer, the term of this patent is extended or adjusted under 35 U.S.C. 154(b) by 329 days.

(21) Appl. No.: 18/393,545

(22) Filed: Dec. 21, 2023

(65) Prior Publication Data

US 2025/0055554 A1 Feb. 13, 2025

Related U.S. Application Data

(60) Provisional application No. 63/532,295, filed on Aug. 11, 2023.

(51) Int. Cl.

| | |
|---|---|
| ***H04B 7/0452*** | (2017.01) |
| ***H04B 7/08*** | (2006.01) |
| ***H04W 24/08*** | (2009.01) |
| ***H04W 56/00*** | (2009.01) |
| ***H04W 72/02*** | (2009.01) |
| ***H04W 72/044*** | (2023.01) |
| ***H04W 84/02*** | (2009.01) |

(Continued)

(52) U.S. Cl.

CPC ........ *H04W 72/046* (2013.01); *H04B 7/0452* (2013.01); *H04B 7/088* (2013.01); *H04W 24/08* (2013.01); *H04W 56/001* (2013.01); *H04W 72/02* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search

CPC .. H04B 7/02–12; H04B 17/0082–3913; H04L 5/0001–0098; H04W 8/22–245; H04W 24/02–10; H04W 28/02–26; H04W 36/0005–385; H04W 48/02–20; H04W 56/0005–0095; H04W 72/02–569; H04W 74/002–0891; H04W 76/10–50; H04W 84/02–16; H04W 88/02–12; H04W 92/02–04; H04W 92/10

See application file for complete search history.

(56) References Cited

U.S. PATENT DOCUMENTS

| | | | | |
|---|---|---|---|---|
| 2019/0356524 A1* | 11/2019 | Yi | ........................ | H04W 72/046 |
| 2019/0380099 A1* | 12/2019 | Hakola | ............... | H04W 72/046 |
| 2020/0396035 A1* | 12/2020 | Yu | ........................ | H04W 72/046 |

* cited by examiner

*Primary Examiner* — Timothy J Weidner

(74) *Attorney, Agent, or Firm* — Fish & Richardson P.C.

(57) ABSTRACT

Disclosed are methods, systems, and computer-readable medium to perform operations including: receiving, from a remote device, a reference signal for each of one or more synchronization signal blocks (SSBs); responsive to the receiving, selecting a receiver (Rx) beam from a set of candidate receiver (Rx) beams, the selecting being based on a sweep of the candidate Rx beams and on measuring the reference signal with one or more of the candidate Rx beams of the set of the candidate Rx beams; and communicating, using the selected Rx beam, an element of common control signaling (CCS) information to the remote device.

19 Claims, 11 Drawing Sheets

(51) Int. Cl.

| | |
|---|---|
| ***H04W 88/02*** | (2009.01) |
| ***H04W 88/08*** | (2009.01) |
| ***H04W 92/02*** | (2009.01) |
| ***H04W 92/10*** | (2009.01) |

800

RECEIVER-FIRST AND UE-FIRST BEAMFORMING IN SUB-TERAHERTZ COMMUNICATION

CLAIM OF PRIORITY

This application claims priority under 35 U.S.C. § 119 (e) to U.S. Patent Application Ser. No. 63/532,295, filed on Aug. 11, 2023, the entire contents of which are hereby incorporated by reference.

BACKGROUND

Many electronic devices communicate with each other using wireless local area networks (WLANs), such as those based on a communication protocol that is compatible with an Institute of Electrical and Electronics Engineers (IEEE) standard, e.g., the IEEE 802.11 standard (also known as “Wi-Fi”). A WLAN typically includes an access point that provides one or more stations (STAs) with access to another network, such as the Internet. There are many generations of the IEEE 802.11 standard, including 802.11ax (Wi-Fi 6) and 802.11be (Wi-Fi 7).

Sub-Terahertz (sub-THz) communications can enable use of new spectrum and provide high data rates. Due to a limited range of sub-THz transmissions, operation in these frequency bands can be limited to specific scenarios where extreme data rates or low latency in local areas are required. In an example, the sub-THz range includes transmission frequencies between about 90 Gigahertz (GHz)-300 GHz. Communication in the sub-THz range is different from the 5G New Radio (NR) frequency bands and 5G NR solutions cannot always be directly applied to these significantly higher frequencies. The challenges include difficult propagation conditions, extreme data rates, limited availability of commercial radio frequency components, and small coverage areas are all examples of fundamental differences to NR impacting the detailed design of a sub-THz system.

Beamforming is essential for operating in the sub-THz range to achieve the desired array gain. Beam-management procedures are defined to select the transmit and receive beam both at the user equipment (UE) and base station. A much larger number of beams in narrower formations can be used when operating in sub-THz frequencies compared to the case of NR in millimeter wave frequencies. The beam alignment between the base station and user equipment becomes increasingly important for sub-THz deployments. Refined procedures for cell search and random access are other consequences of the increased number of beams. Line-of-sight channels are expected to be common.

SUMMARY

This specification describes systems and methods configured for performing operations for a receiver-first (Rx-first) beamforming process for use in sub-THz communication links. The specification also describes systems and methods for performing operations for a user equipment (UE) first beamforming process for use in sub-THz communication links. Specifically, the systems and methods are configured wherein the receiver (e.g., an access point (AP) or UE) performs beamforming sweeps on the receiver side prior to applying the beam at each of the transmitter and the receiver for use in a communication link. For example, a UE obtains a beam to the AP using a receiver beam sweep before the AP determines an AP-to-UE beam for that specific UE. Both the UE and AP can perform beamforming where they first apply sweeps while being a receiving device (first UE in DL, then AP in UL) before using a selected beam for active transmission. A primary use case is that the UE is the receiver, and the AP is the transmitter, but the opposite can also be the case. A system link budget is configured so that the single-sided beamforming (e.g., omnidirectional transmitter signals and beamforming receiver) is sufficient for control signaling.

The systems and methods described herein enable one or more of the following advantages. Performing a beam sweep on the receiver side only prior to establishing the communication link reduces an amount of beam feedback that occurs during configuration of a communications link. The reduction in beam feedback increases an efficiency for configuring the communication link and is a process that is less error prone, as subsequently described.

The Rx-first beam sweeps are enabled by frequent transmission of omnidirectional transmitter reference signals. The receiver can always quickly establish or reestablish the receiver beam and thus a working control link to the transmitter. The receiver can quickly react to changes in the environment that may require a different beam to be used in the communication link. The quick reaction times result from the fact that no handshake or exchange from the AP is necessary to initiate the Rx sweep. For example, a UE as a receiver can quickly react to rotations of the UE (e.g., a user turns his head) and update the UE beams, accordingly. The UEs have a flexibility for how to use their reference signal, such as during a beam search strategy or to save power.

The AP can improve its operation as well. For example, the AP operates control signaling omni-directionally. This enables all users, who can always have suitable beams, to always participate in the same time slot, which is efficient and robust relative to a scenario in which only a portion of the users can participate during a given time slot. The AP can perform beam sweeps on demand (by requesting reference signal from UE) as needed. For example, the AP can perform beam sweeps to determine or test a link quality, perform digital beamforming capabilities, and so forth. This results in a high degree of flexibility for the AP and is an efficient use of resources relative to a scenario in which the AP uses a directional beam for reference signals. The omnidirectional AP reference signals for the UE beam search and the omnidirectional AP-side control signaling slots can each enable a low per-frame overhead for the communication link. The low overhead in turn allows for shorter frames relative to communication links in which parts of the frame are reserved for multiple beam-specific transmission slots that can only be used for communication with users whose beam directions are compatible. The relatively lower overhead of the receiver-first or UE-first beamforming process enables more frequent beam searches and supports high mobility scenarios for the UE.

In a general aspect, a method includes receiving, from a remote device, a reference signal for each of one or more synchronization signal blocks (SSBs); responsive to the receiving, selecting a receiver (Rx) beam from a set of candidate receiver (Rx) beams, the selecting being based on a sweep of the candidate Rx beams and on measuring the reference signal with one or more of the candidate Rx beams of the set of the candidate Rx beams; and communicating, using the selected Rx beam, an element of common control signaling (CCS) information to the remote device.

In some implementations, selecting the Rx beam occurs prior to the remote device selecting a local, transmitting beam for transmitting information.

In some implementations, communicating, using the selected beam, the element of CCS information with the remote device comprises transmitting an element of uplink CCS (UL CCS) information to the remote device. In some implementations, the element of UL CCS information comprises an initial presence indication for a UE. In some implementations, the element of the UL CCS information includes buffer status reporting from a UE. In some implementations, the element of the UL CCS information specifies a beam update of a UE, the beam update causing the remote device to perform a beam sweep for further communication with the UE. In some implementations, wherein the element of the UL CCS information specifies a lateral movement that exceeds a threshold.

In some implementations, communicating, using the selected Rx beam, the element of CCS information with the remote device comprises receiving an element of downlink CCS (DL CCS) information from the remote device. In some implementations, the element of DL CCS information indicates scheduling for a UE-specific DL or UL data transmission. In some implementations, the element of DL CCS information indicates a common control slot monitored by all UEs communicating with the remote device. In some implementations, the element of DL CCS information indicates a dynamic frame format element comprising an optional SSB.

In some implementations, the reference signal comprises an omnidirectional signal for each of the one or more SSBs. In some implementations, the one or more SSBs each specify a frame start and frame length from each individual SSB transmission and transmission frequency information for communicating the CCS information with the remote device. In some implementations, the one or more SSBs each specify an identifier associated with the remote device.

In some implementations, the process includes performing a coarse beam search based on receiving the reference signal for at least one or more synchronization signal blocks (SSBs).

In some implementations, the process includes performing a beam recovery based on receiving the reference signal for each of one or more synchronization signal blocks (SSBs).

In some implementations, the process includes receiving, from the remote device, a request for a beamformed uplink reference signal (SRS). In some implementations, the process includes sending the SRS responsive to receiving the request.

In some implementations, an SRS is transmitted after a downlink CCS and before a listen-before-talk (LBT) period. In some implementations, an SRS is appended to already scheduled uplink data or control signaling. In some implementations, the remote device includes an access point (AP).

In a general aspect, the process includes transmitting a reference signal for each of one or more synchronization signal blocks (SSBs) in an omni-directional transmission; and communicating, responsive to the transmitting, common control signaling (CCS) information with a user equipment (UE), the communicating using a first beam that is selected based on a second beam selected by the UE.

In some implementations, the process includes performing uplink (UL) multiple-in-multiple-out (MIMO) channel measurements. In some implementations, the process includes selecting the beam based on the UL MIMO measurements.

In some implementations, the process includes communicating with multiple UEs based on multiplexing beamformed uplink reference signals (UL SRSs), the multiplexing occurring in a time domain or a code domain. In some implementations, the process includes receiving, from the UE, information specifying a beam update for the UE beam selected by the UE. In some implementations, the process includes transmitting a request for an SRS for a new beam sweep or uplink measurement for the UE.

In a general aspect, an apparatus comprising one or more baseband processors configured to perform operations comprising: receiving, from a remote device, a reference signal for each of one or more synchronization signal blocks (SSBs); based on the receiving, selecting a first beam from a set of candidate receiver (Rx) beams, the selecting further based on measuring the reference signal with one or more of the candidate Rx beams of the set of the candidate Rx beams; and communicating, using the selected first beam, common control signaling (CCS) information with the remote device.

In a general aspect, an apparatus comprising one or more baseband processors configured to perform operations comprising: transmitting a reference signal for each of one or more synchronization signal blocks (SSBs) in an omni-directional transmission; and communicating, responsive to the transmitting, an element of common control signaling (CCS) information with a user equipment (UE), the communicating using a first beam that is selected based on a second beam selected by the UE.

In a general aspect, a process includes one or more operations as described herein. In a general aspect, a wireless device is configured to perform one or more operations as described herein.

The details of one or more embodiments of these systems and methods are set forth in the accompanying drawings and the description below. Other features, objects, and advantages of these systems and methods will be apparent from the description and drawings, and from the claims.

DETAILED DESCRIPTION

Figure 1:
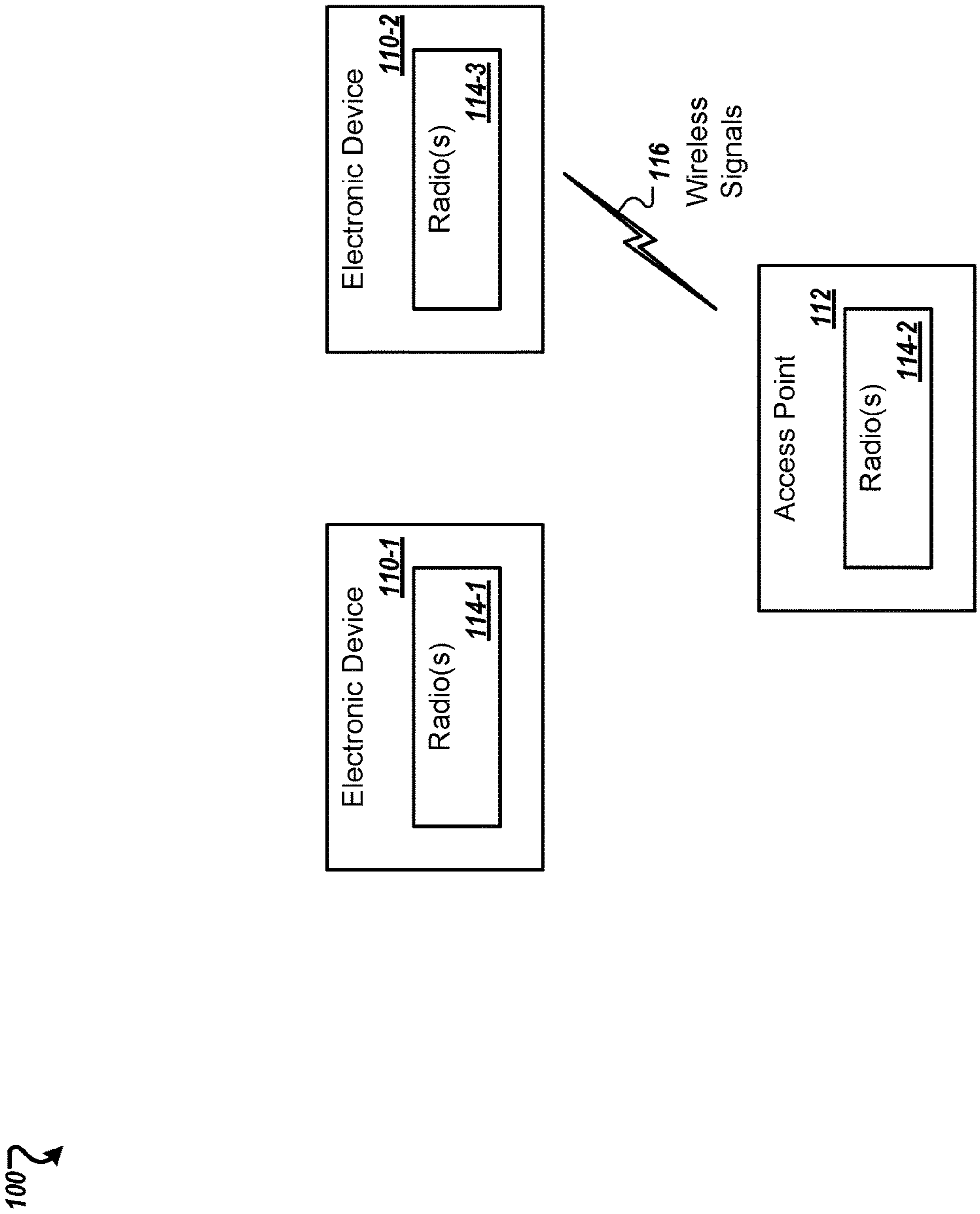
FIG. 1 illustrates a block diagram of example of electronic devices communicating wirelessly, according to some implementations.

The sub-THz frequency range is a candidate for Sixth Generation (6G) networks because of bandwidth that enables transmission of hundreds of gigabits per second (Gbps). Because of the high directivity required in sub-THz systems relative to omni-directional systems, eavesdropping is much harder relative to omni-directional systems. The sub-THz communication links achieve a higher privacy level by default.

The sub-THz frequency range however also introduces additional complexity compared to an omni-directional system. Specifically, sub-THz communication links use specific transmitting hardware and phased array (PA) technology to cope with the high frequency. Due to large pathloss for sub-THz communication links, use cases for these networks are generally indoor use-cases with a short range. To overcome the pathloss, the receiver and/or transmitter are configured for a high antenna gain achieved using antenna arrays with many antennas. The beams created by the antenna arrays are narrow (e.g., narrower than current 3GPP frequency range 2 (FR2) millimeter wave (mmWave) systems).

The use of relatively narrow beams affects, for the receiver and the transmitter, access to the channel and handling of data-transfer on the channel. For example, relatively complicated beam searches are performed between the AP and the UE. Specifically, when the network requires beamforming gain on both sides of the link for high data rate transmission, the devices align both beams on the Tx and Rx side (e.g., to point to each other in free space). High gains (many antennas) entail narrow beams. When analog beamforming is performed, the devices sequentially try beams until the best beams are found. In legacy systems this is often done on the Tx and Rx sides of the link simultaneously. This can require a nested loop, which takes a long time and, for Tx-first approaches, requires feedback signaling. Once the UE has found a good beam pair, the UE informs the base station by transmitting on one of multiple differently Rx-beamformed resources (e.g., PRACH in 3GPP NR) in the uplink. Overall, these procedures are more complicated compared to non-beamformed systems or compared to the approaches described herein in which an AP uses omni control signaling.

Additionally, the complexity of beam tracking scales with the number of beams to be handled by the transmitter or the receiver. The receiver and the transmitter should have predefined processes to handle beam recovery.

For scenarios using the unlicensed spectrum, beam handling and UE access can be complicated. Unlike in 3GPP scenarios, conflicts between different users of the same RAT or different RATs using the same spectrum might occur. Multi-user scheduling and coordination are much more difficult compared to licensed spectrum usage. Due to high directivity of sub-THz communication, the receiver and transmitter have predefined beam alignment procedures, including for initial beam establishment and beam tracking. These procedures cause overhead and rely on a high level of coordination between the UE and the AP. The state-of-the-art TX beam sweeping of the receiver and/or transmitter requires feedback for operation. TX beam sweeps introduce interference in multiple directions as the sweep is performed. In scenarios in which there is movement, such as use cases that allow for rotational movements, beam tracking is difficult. These scenarios can include head-mounted displays, for example. A sub-THz RAT uses processes and control resources (including a specific suitable frame format) to support beam establishment, tracking, and fast recovery. A sub-THz RAT also relies on a specific beam format for control communication between the AP and UEs.

The systems and processes herein for receiver-first and UE-first beamforming for use in sub-THz communication links overcome the foregoing complications for sub-THz communication links. By using Rx-first beamforming and UE-first beam sweeps, a UE can quickly reacquire the UE beam. For example, in high-mobility scenarios, or scenarios with many rotations, there is no need for feedback loops between the UE and the AP. This contrasts with transmitter sweeps in which the receiver (or other device) generates and sends feedback for selection of the best beam. The Rx-first beamforming and UE-first beam sweeps enable relatively short low-overhead frames. Rx-first beamforming and UE-first beam sweeps enable the UE(s) to act autonomously such that the UE only needs data from its own sensors. Rx-first beamforming and UE-first beam sweeps reduces feedback overhead (and thus error potential and implementation complexity) compared to SSB or channel state information reference signal (CSI-RS)-based beam feedback, which is performed in 3GPP new radio (NR) networks. The Rx-first beamforming and UE-first beam sweeps eliminate a flashlight-effect that pollutes the environment with random high-power interference caused by the transmitter-side beam sweep.

The omnidirectional control signaling by the AP is relatively efficient and robust relative to using Tx beamforming approaches. For example, all users can share one uplink and downlink control slot, respectively. This results in a relatively low frame overhead. The omnidirectional control signaling by the AP is power efficient because it reduces a duty cycle in which the UE monitors the control channel. The omnidirectional control signaling by the AP enables a UE to recover the control link quickly without requiring an AP control loop, resulting in a relatively fast beam recovery compared to legacy approaches.

FIG. 1 illustrates a block diagram 100 of example of electronic devices communicating wirelessly, according to some implementations. Notably, one or more electronic devices 110-1 and 110-2 (collectively devices 110), such as a smartphone, a laptop computer, a notebook computer, a tablet, or another such electronic device, and access point 112 can communicate wirelessly in a WLAN using an IEEE 802.11 communication protocol. Thus, electronic devices 110 can be associated with or can have a connection with access point 112. For example, electronic devices 110 and access point 112 can wirelessly communicate while: detecting one another by scanning wireless channels, transmitting and receiving beacons or beacon frames on wireless channels, establishing connections (e.g., by transmitting connect requests), and/or transmitting and receiving packets or frames (which can include the request and/or additional information, such as data, as payloads). Note that the access point 112 can provide access to a network, such as the Internet, via an Ethernet protocol, and can be a physical access point or a virtual or "software" access point that is implemented on a computer or an electronic device. In this specification, electronic devices 110 are sometimes referred to as "recipient electronic devices" or "receiver stations."

Although the environment shown in FIG. 1 is provided as an example, in alternative implementations, different numbers and/or types of electronic devices can be present. For example, some implementations can include more or fewer electronic devices. As another example, in some implementations, different electronic devices can be transmitting and/or receiving packets or frames. In some implementations, multiple links can be used during communication between electronic devices 110.

As described further below with reference to FIG. 11, electronic devices 110 and access point 112 can include subsystems, such as a networking subsystem, a memory subsystem, and a processor subsystem. In addition, electronic devices 110 and access point 112 can include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options, transmit and receive packets or frames via the connection, etc.

As shown in FIG. 1, wireless signals 116 are communicated by one or more radios 114-1 and 114-2 in electronic device 110-1 and access point 112, respectively. For example, as noted previously, electronic device 110-1 and access point 112 can exchange packets or frames using a Wi-Fi communication protocol in a WLAN. Further, one or more radios 114-1 can receive wireless signals 116 that are transmitted by one or more radios 114-2 via one or more links between electronic device 110-1 and access point 112. Alternatively, the one or more radios 114-1 can transmit wireless signals 116 that are received by the one or more radios 114-2.

In some implementations, wireless signals 116 are communicated by one or more radios 114 in electronic devices 110 and access point 112, respectively. For example, one or more radios 114-1 and 114-3 can receive wireless signals 116 that are transmitted by one or more radios 114-2 via one or more links between the electronic devices 110-1 and 110-2, and the access point 112.

In some implementations, the access point 112 can group the electronic devices 110 into a target station set. The target station set concept comes from downlink multi-user transmission where the access point 112 can transmit to multiple stations simultaneously in one PPDU using Orthogonal Frequency Division Multiple Access (OFDMA) or multiuser (MU) Multiple Input Multiple Output (MU-MIMO). Here, the target station set is a set of stations that can simultaneously be served by the access point 112. The stations in the set do not need to share the same PHY parameters, such as MCS, number of streams, etc.

In some implementations, the access point 112 can simultaneously communicate with a plurality of electronic devices 110 using multiuser (MU) techniques, such as MU Multiple Input Multiple Output (MU-MIMO). In some examples, the access point 112 communicates with the electronic devices 110 using frequency multiplexing such that the access point 112 allocates each of the electronic devices a portion of the overall bandwidth. For example, to simultaneously communicate with four electronic devices over an 80 Megahertz (MHz) bandwidth, the access point 112 transmits a MU-PPDU over the 80 MHz bandwidth. The MU-PPDU includes a sub-PPDU for each of the four electronic devices, where each sub-PPDU (or sub-channel) is allocated 20 MHz. The access point 112 can use the MU-PPDU to communicate with devices in the same target set, devices in different target sets, or a combination of both.

In some implementations, access point 112 and one or more electronic devices can be compatible with an IEEE 802.11 standard that includes trigger-based channel access, e.g., IEEE 802.11ax. In 802.11ax, Orthogonal Frequency Division Multiple Access (OFDMA) is used to enable simultaneous communications between the access point 112 and multiple electronic devices. OFDMA divides the available physical spectrum into multiple orthogonal sub-channels, or resource units (RUs), which can be allocated to different electronic devices (users). Under the standard, the access point 112 coordinates multiuser OFDMA by broadcasting a trigger frame which, among other things, allocates a RU to each participating electronic device. Each electronic device responds to the trigger frame by transmitting a PPDU to the access point 112 using the allocated RU. The trigger frame can also include power control information. The access point 112 can instruct all electronic devices 110 when to start and stop transmitting. Note that access point 112 and the electronic devices 110 can communicate with one or more legacy electronic devices that are not compatible with the IEEE 802.11 standard (i.e., that do not use multi-user trigger-based channel access).

In some implementations, processing a packet or frame in one of electronic devices 110 access point 112, or a combination of both, includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

As discussed previously, one or more of electronic devices 110 and access point 112 can communicate with each other. Notably, access point 112 can transmit a PPDU that includes a preamble and a data field. In some implementations, access point 112 can be configured to use concatenated PPDUs (C-PPDUs), e.g., for low latency communications with receiver stations. A C-PPDU includes a plurality of component PPDUs, each of which includes preamble and a data payload. As described in more detail below, the C-PPDU includes a plurality of component PPDUs. The first component PPDU is preceded by a first preamble called a "full preamble." The remaining component PPDUs in the C-PPDU are each preceded by respective preambles that are shorter in length than the first preamble. In some implementations, the access point 112 might not perform contention or receive a block acknowledgement (BA) before the plurality of component PPDUs are transmitted.

In 3GPP NR (especially in FR2), AP-UE beam alignment is performed. The base station (e.g., a gNB) sweeps over the transmission beams while transmitting SSB bursts. The sweep over the transmission beams generates a dynamic high power interference pattern around gNB. For NR networks in the licensed spectrum, the interfered neighbor cells belong to same operator, who can take such inter-cell interference into account. The UE searches for an SSB and performs UE-side Rx beamforming sweeps at the same time, resulting in a nested loop in which the UE proceeds with measuring until a matching gNB and UE beam coincide. The UE performs relatively long initial searches. For example, 3GPP TS 38.133 provides for a UE search time budget duration of 480 ms. The base station awaits transmitter beam feedback from the UE, and generally the base station uses multiple physical random-access channel (PRACH) resources for obtaining the feedback.

The beam refinement process in legacy systems uses complex control signaling. A request from the base station to the UE to perform measuring and feedback is sent along with dedicated CSI-RS measurement and reporting resources. These transmissions add overhead to frame and complexity and cost to the configuration of each of the base station and the UE.

For 802.11ad, an AP can perform transmission-first beam sweeps. The AP generates a highly dynamic beamformed interference in the surroundings of the AP. Because of the use of the unlicensed spectrum, the interfered systems are not aware and cannot adapt. The relatively high amount of beamforming and control overhead per frame results in overall frames being long. The longer frames result in a slower reaction, by the network, to user movement. To include the beacon header interval including the SSW frames and feedback for each A-BFT slot, typical total frame durations (e.g., the beacon interval) are 100 ms. The BHI durations for the beam alignment phase can be few milliseconds each frame. The control (header) information in ATI is repeated with user-specific beamforming, generating a long control overhead in the frame. Because of transmitter-beamformed control signaling during the ATI from the AP, UEs monitor multiple control slots. The monitoring of multiple control slots results in a relatively poor power efficiency, as a high duty cycle results. In legacy systems, for scenarios in which a UE-side beam change detection occurs (e.g., due to rotation movement), the AP requires explicit signaling for transmitter beamforming during the ATI. The explicit signaling introducing extra latency and overhead.

The systems and processes herein for receiver-first beamforming for use in sub-THz communication links remove much of the signaling overhead. The base station (e.g., a gNB) no longer sweeps over the transmission beams while transmitting SSB bursts, and the dynamic high power interference pattern around the gNB is eliminated. The UE does not perform the relatively long searches for an SSB while performing UE-side Rx beamforming sweeps. Specifically, the receiver (e.g., the UE) does a sweep through all or some possible Rx beams while the transmitter (e.g., the AP) transmits omnidirectionally. An advantage is that, with the right Rx beam, the receiver can receive all SSB instances because the SSB instances are sent omnidirectionally. By contrast, in NR, a beam-sweeping receiver needs to have its Rx beam candidate coincide with an appropriate Tx beam on the gNB side during gNB sweep, which may be based on chance.

The receiver-first and UE-first beamforming eliminates the control signaling for beam refinement, as subsequently described. The base station does not need to send the request to the UE to perform measuring and feedback, avoiding use of dedicated CSI-RS measurement and reporting resources. In addition, the AP does not perform transmission-first beam sweeps. This avoids generation of the highly dynamic beamformed interference in the surroundings of the AP.

The relatively short frames for beamforming result in a faster reaction, by the network, to user movement. The SSW frames and feedback for each A-BFT slot are reduced or eliminated, as subsequently described. The typical total frame durations (e.g., the beacon interval) are reduced to less than 100 ms. The UE does not need to monitor multiple control slots, improving power efficiency by reducing the duty cycle.

Figure 2:
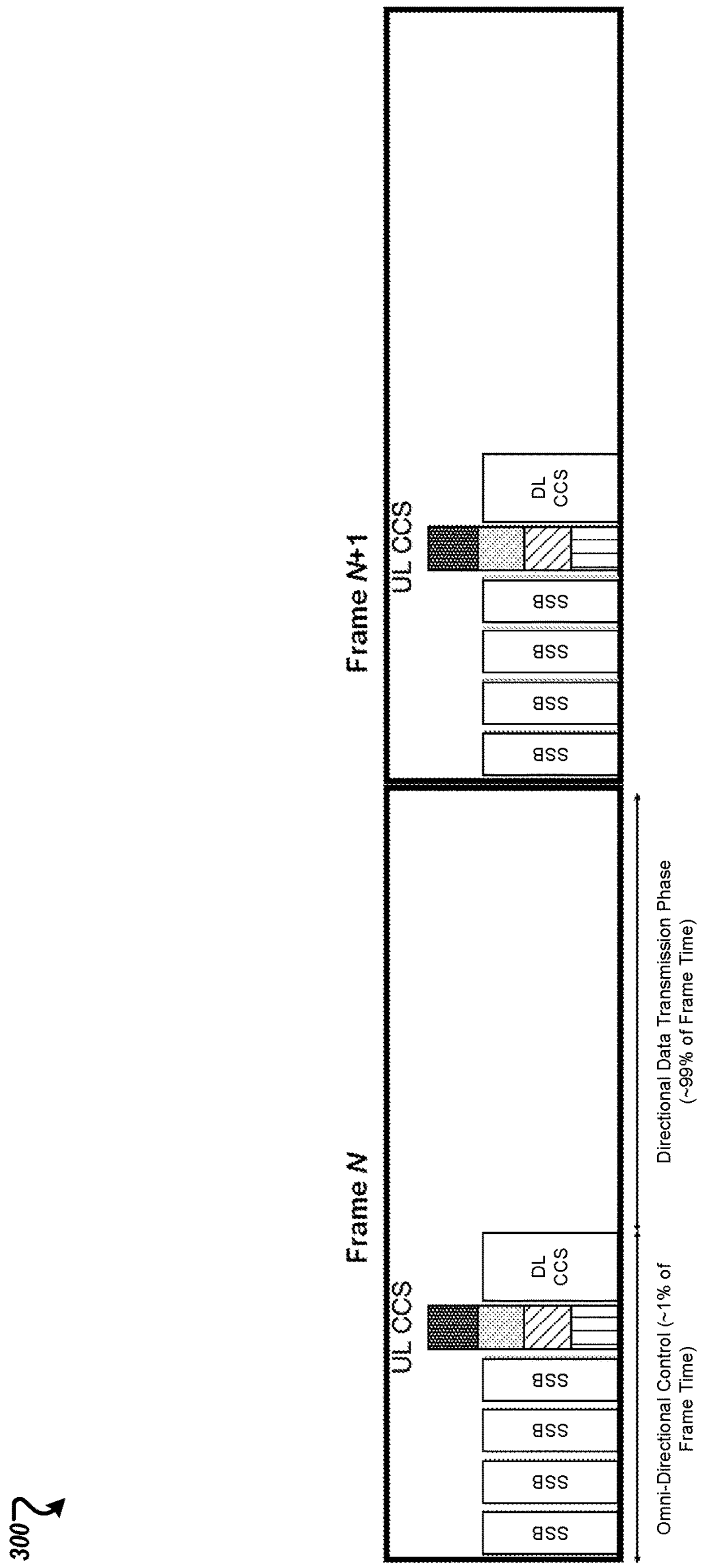
FIG. 2 illustrates an example frame structure for receiver-first omni-control.

FIG. 2 illustrates an example frame structure 300 for receiver-first omni-control. Generally, in each frame there is a control phase in which the sub-THz AP transmits and/or receives omni-directionally. A majority of the frame Nis data transmission, in which beamforming occurs at both the AP and UE. At the beginning of the frame N, the AP omni-directionally transmits burst of reference signals (SSBs), which UEs can use to perform an Rx beam sweep towards the AP. The frame N includes, in addition to the SSBs, uplink (UL) common control signaling (CCS), and downlink (DL) CCS, shown in FIG. 2. Note that terms "SSB" or "SRS" are used in analogy to NR systems because the proposed transmission content could be similar, though the transmission schemes differ significantly.

The UE uses a found beam based on the omnidirectional transmissions from the AP. Specifically, the UE finds an Rx beam towards the AP and uses that beam for subsequent Tx (UL/DL reciprocity). The UE selects a beam for control transmissions towards AP in a UL CCS phase. During the UL CCS phase, the AP listens omni-directionally to control signals from all users. The AP performs this in a multiplexed way, such as in the frequency domain or code domain. For the DL CCS phase, the AP omni-directionally transmits control information to users who receive with the selected UE beam. The AP can reach all UEs within the same slot. The process repeats for frame N+1.

Figure 3:
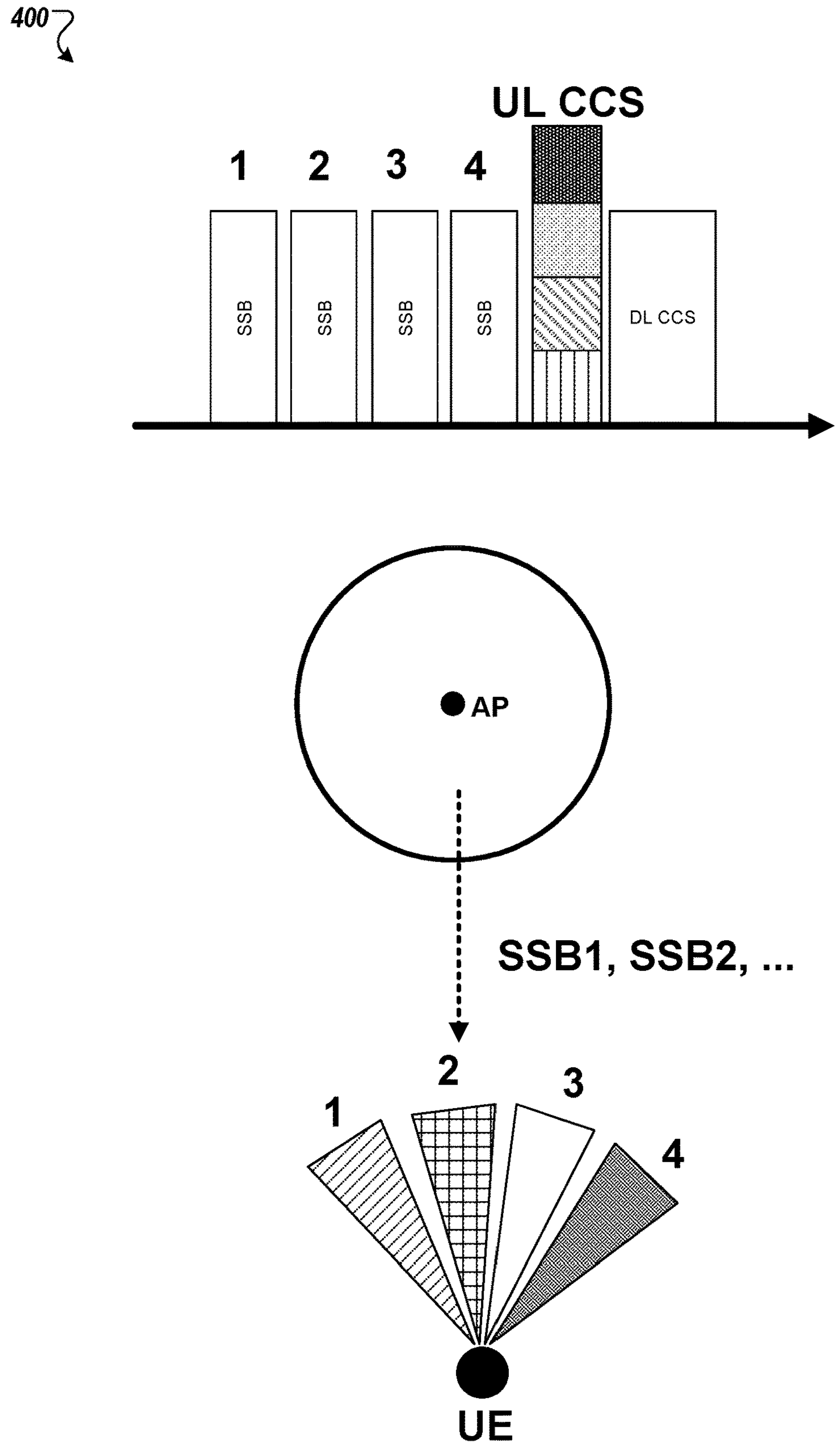
FIG. 3 illustrates an example showing a receiver-first or UE-first beam sweep.

FIG. 3 illustrates an example network 400 showing a receiver-first or UE-first beam sweep. The beam sweep is based on the omni-directional control signal of FIG. 2. At the beginning of the frame, the AP sends synchronization bursts (SSB1, SSB2, . . . ) to allow for the UE beam search and to obtain the initial sub-THz network information. During these omni-directional SSB bursts, the UE sweeps through the UE receiver beams (e.g., beams 1, 2, 3, and 4) to find the AP and the best receiver beam. The number of SSBs per frame is limited. However, because SSB durations are about ~1 microsecond (μs), even if the frame is only 5 ms, the overhead is not significant. As an illustrative example, the AP can send up to 32 SSBs per frame and still have a less than 1% overhead. Furthermore, in an illustrative example, a 5 ms total frame duration can allow UE beam updates every 5 ms, which support fast rotations of the UE and high-mobility scenarios. This example is illustrative, and the thresholds or other values can change based on changes to the particular implementation.

Each UE can use the SSB in a different way, increasing flexibility of the network. For example, a UE can perform an initial (coarse) beam search. The UE can perform the initial or coarse beam search over more than one frame to search a wider beam search space. The UE can perform constant beam tracking by trying new (e.g., surrounding) candidate beams. The UE can react quickly during scenarios in which there is rotation of the UE. The UE can perform fast beam recovery scenarios in which the previous beam is lost. The UE, during scenarios with low mobility, can skip the beam search or receive just one SSB to update time/frequency tracking.

As previously discussed, after the UE beam sweep is completed, the UE knows which Rx/Tx beam is oriented towards the AP. The UE finds an Rx beam towards the AP and uses that beam for subsequent Tx (UL/DL reciprocity). The UE can immediately use the selected beam without need for signaling the beam towards the AP. This configuration reduces control overhead, as previously discussed.

The SSB payload can include the following information. The SSB can include timing information that the UE can use to determine a frame start and frame length from each individual SSB transmission. The SSB can include further control information such as an AP identifier or an indication of the frame configuration.

Figure 4:
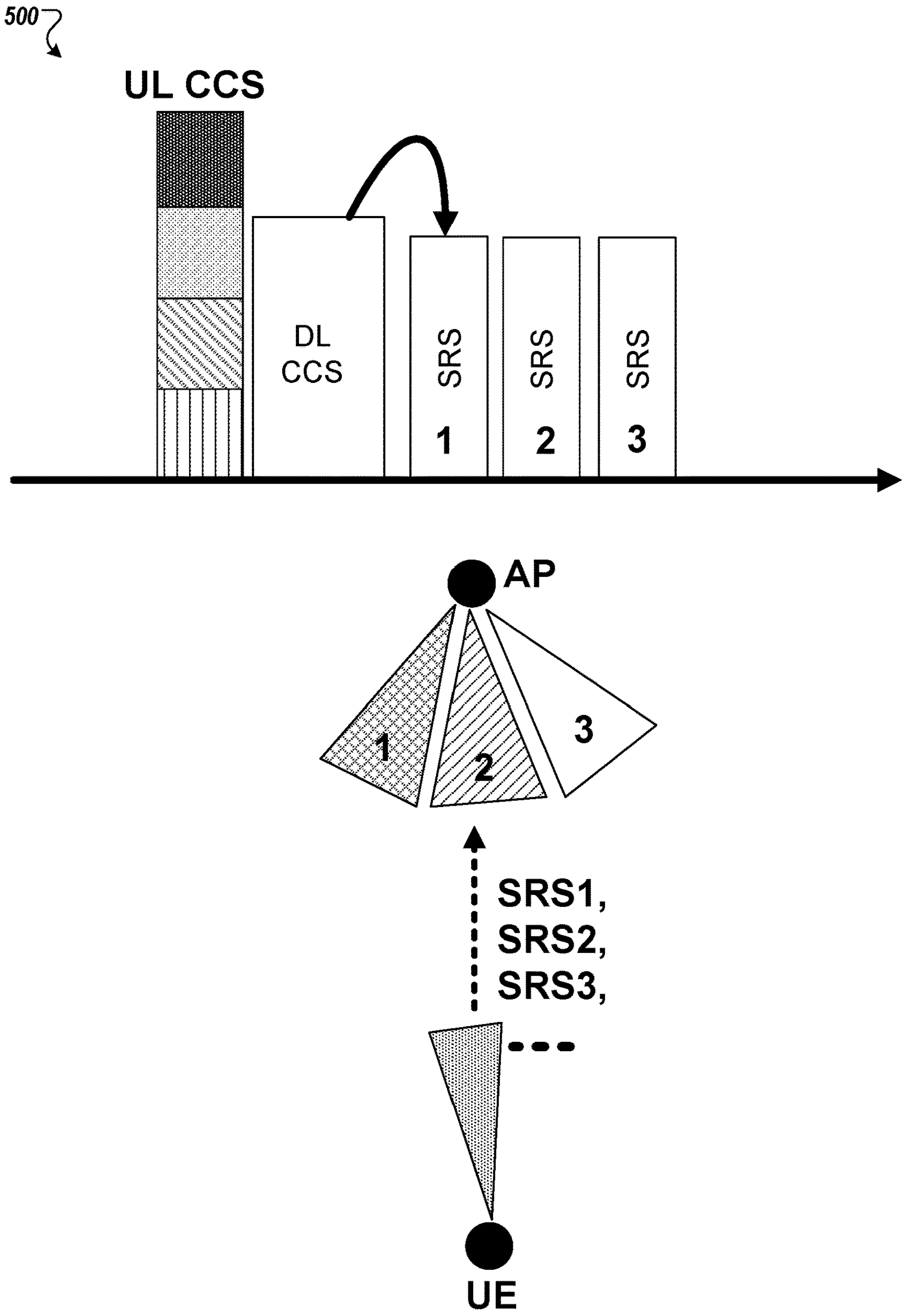
FIG. 4 illustrates an example network showing a receiver-first or a UE-first beam sweep for AP beam alignment.

FIG. 4 illustrates an example network 500 showing a receiver-first beam sweep for AP beam alignment. The network 500 can be like the network 400 described previously in reference to FIG. 3. As shown in FIG. 4, the AP does not perform transmission beam sweeps. The AP obtains the Tx beam either from the receiver beam sweep or, alternatively, from UL multiple-input and multiple-output (MIMO) channel measurements. The AP beams are labeled 1, 2, and 3 in FIG. 4.

The AP can request that individual UEs transmit a beamformed uplink reference signal (SRS). FIG. 4 shows the UE sending SRS1, SRS2, SRS3 . . . and so forth. The SRS enables the AP to perform a receiver beam sweep if necessary, such as for analog beamforming. The AP can use a single SRS for MIMO channel estimation for the scenarios using digital beamforming. The request is signaled from the AP to UEs using a request in the common downlink control signaling (DL CCS). The request is sent at the beginning of frame so that the best beam is already known for directional listen-before-transmit (LBT) reservation and scheduling purposes during the data transmission phase later in the frame as shown in FIG. 2.

The AP can multiplex UL SRS so that multiple users share a time slot, similar to NR networks. The multiplexed UL SRS can be provided in case the AP performs digital beamforming or is configured to test candidate beams that are suitable for multiple users, such as very coarse beams.

The AP can be configured to request an SRS for a new beam sweep or UL measurement if the UE provides information specifying a significant beam update. For example, if a UE selects a beam towards a completely different multipath, the AP most likely also needs to adapt its beam. The UE can always find a UE beam on its own and perform a beamformed UL CCS transmission to signal to the AP that an AP beam update might be necessary.

The AP can request an extra SRS transmission for beam refinement/improvement. The request (from the AP) could be via DL CCS or other downlink (data/control) communication. The SRS transmission can be part of (e.g., concatenated to) another UL (control/data) transmission The request and response only cause a low overhead for users that are transmitting in the UL anyway to avoid using dedicated SRS slots. The fine-tuned beam can be used in the next transmission, rather than the current one.

The configuration of the SRS transmission from the UE enables transparent support of hybrid/digital beamforming at the AP. The number of SRS transmissions can be configured. For example, the UE and AP can use a smaller number of SRS transmission if UL MIMO channel estimation is performed at the AP. The UE can use multiple SRS repetitions for an (analog) AP receiver beam sweep.

Figure 5:
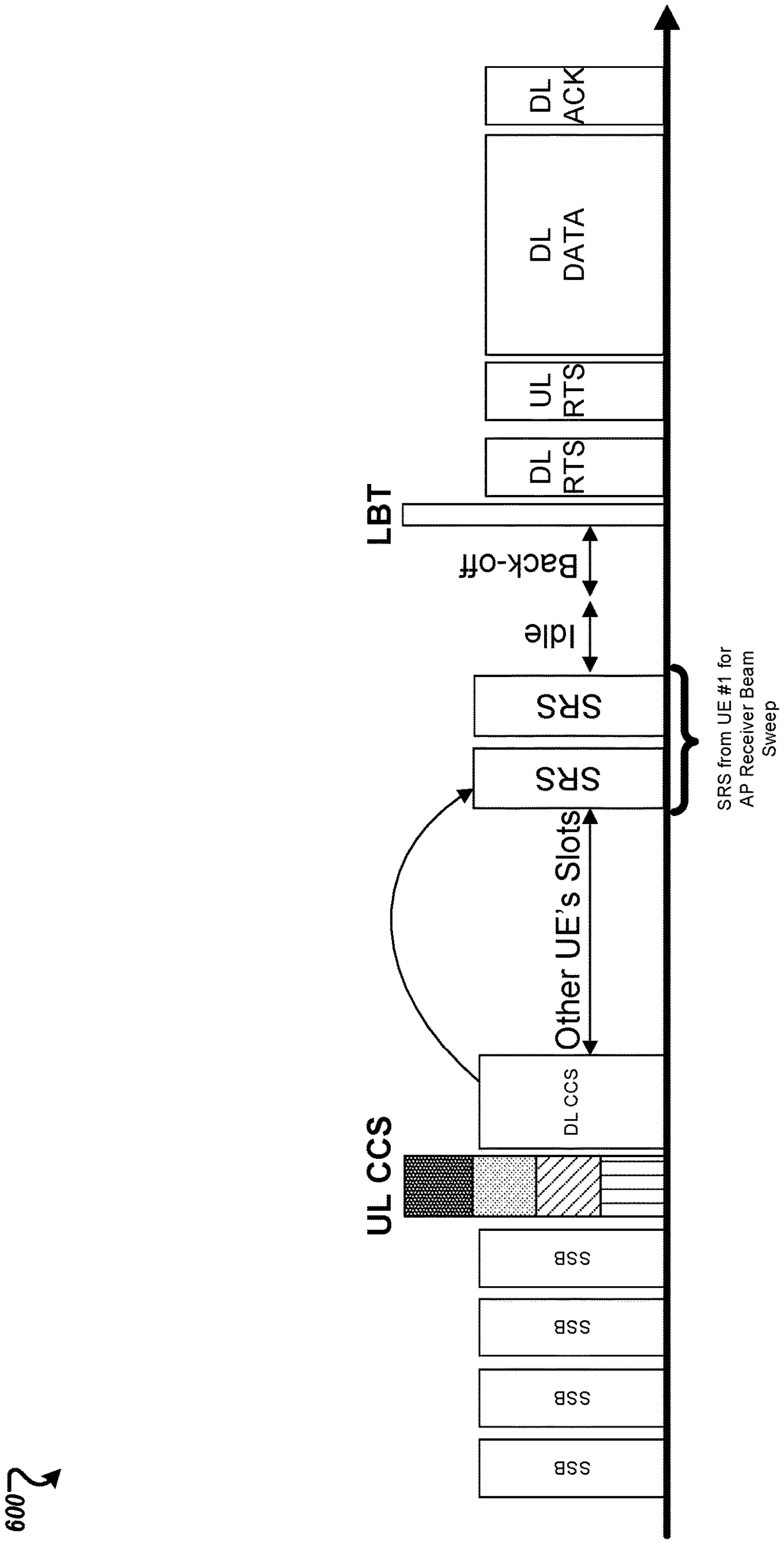
FIG. 5 illustrates an example timing diagram of a frame for scheduling of SRS transmission.

FIG. 5 illustrates an example timing diagram of frame 600 for scheduling of SRS transmission. The frame 600 includes multiple SSBs, a UL CCS, a DL CCS, a time gap, multiple SRSs that are linked to the DL CCS, an idle time, a back off time, and then the LBT period. After the LBT, the UE can perform downlink RTS, uplink CTS, downlink data reception, and downlink acknowledgement. The SRS transmissions are for the UE for the AP receiver beam sweep. The data transmissions can include a DL AP to UE transmission where the AP performs LBT after idle and backoff, requests transmission via DL RTS from AP to UE, receives UL CTS answer from UE, and then transmits DL data from the AP to UE followed by an ACK from the UE to the AP.

A default timing for the SRS transmissions is to occur immediately after DL CCS and before data transmission. In some implementations the AP requests the SRS in DL CCS, and the SRS resources are directly used for data. In some implementations, the UE and AP use the DL CCS control signaling to dynamically schedule further SRS transmissions.

As shown in diagram of frame 600, data transmission occurs in a latter part of frame. In an example, a first user is scheduled, then a second user. The AP requests the SRS immediately before the second user's data transmission. This results in a more up-to-date and better use of the whole frame 600.

Figure 6:
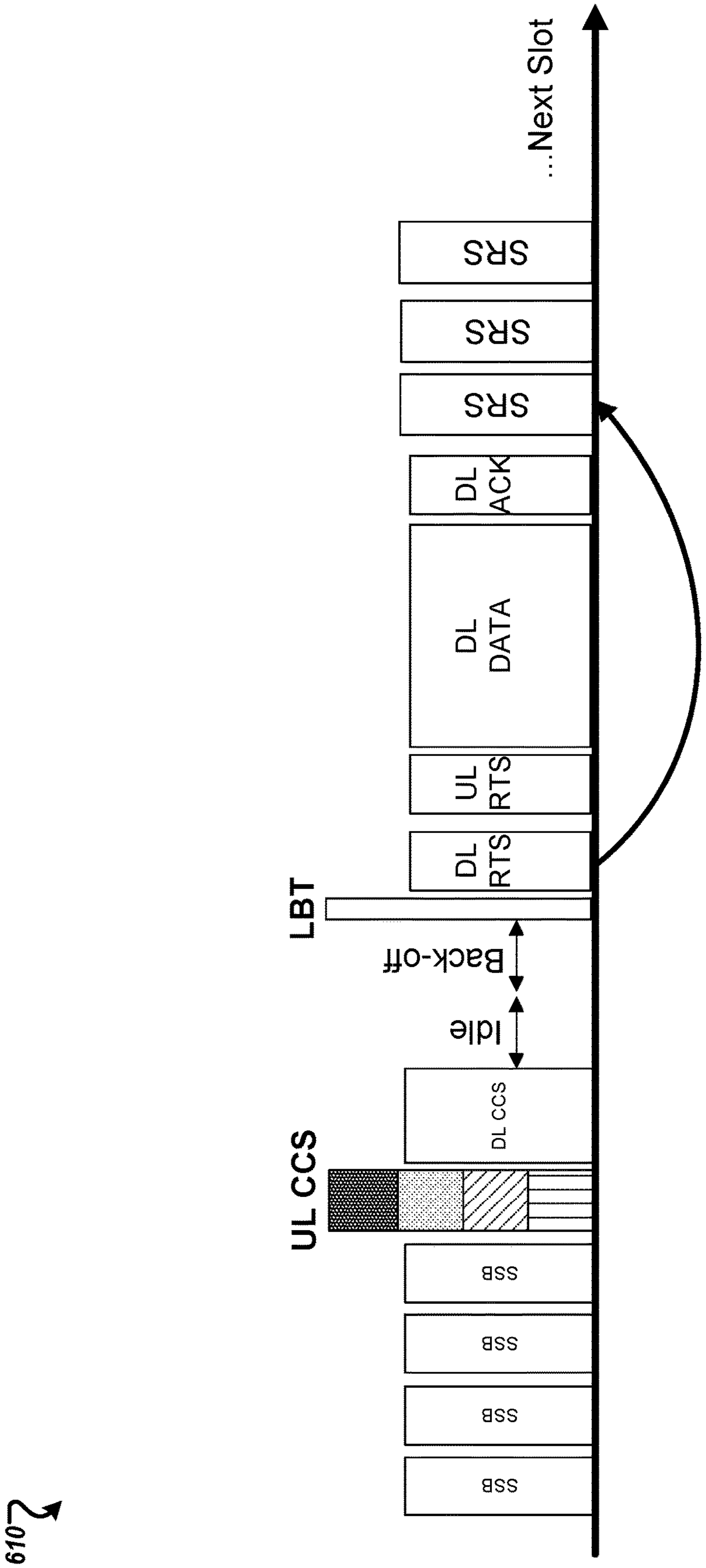
FIG. 6 illustrates an example timing diagram of a frame for scheduling of SRS transmission.

FIG. 6 illustrates an example timing diagram of a frame 610 for scheduling of SRS transmission. In frame 610, a first portion of the frame includes multiple SSB transmissions. A UL CCS follows the SSB transmissions. A DL CCS follows the UL CCS. The frame 610 includes an idle period and a back off period, followed by the LBT period. After LBT begins, the UE is configured for DL RTS, UL CTS, downlink data, downlink acknowledgement, and then the multiple SRS transmissions occur. The arrangement of SRS transmission in frame 610 contrasts with frame 610, in which the multiple SRS transmissions occur after the DLCS and prior to the LBT period. The DL RTS can schedule the multiple SRS transmissions. The DL RTS is control signaling that is sent from the AP to the UE. This occurs so that the AP can piggyback the SRS request. The SRS are concatenated to the DL ACK response (e.g., the acknowledgement of DL data sent by UE in the uplink). Because the UE is already transmitting, the UE can append the SRS so that no additional Tx slot is needed.

For beam refinement, the AP can request that the UE append the SRS to already-scheduled UL data/control signaling. This configuration requires relatively less overhead than using discrete slots for the SRS transmissions because the UE is already transmitting. The UE can use the refined beam in a next frame rather than the current frame.

Figure 7:
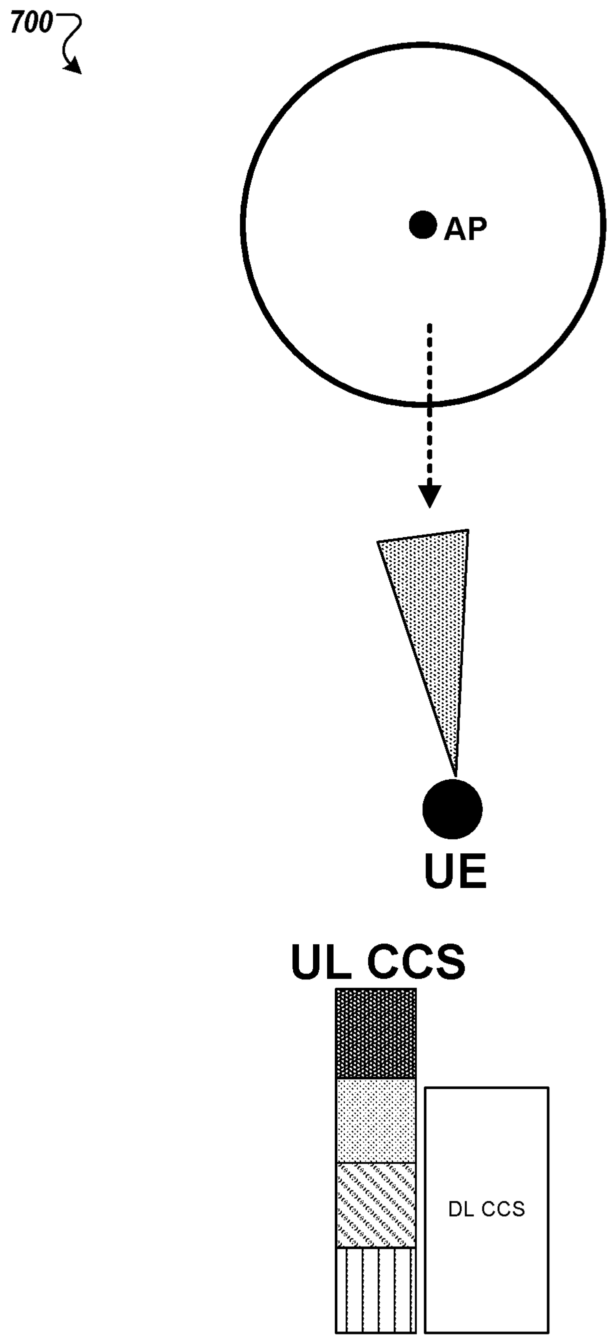
FIG. 7 illustrates an example network showing UE-first beamforming including omnidirectional common control signaling (CCS) at the AP.

FIG. 7 illustrates an example network 700 showing UE-first beamforming including omnidirectional common control signaling (CCS) at the AP. Each frame the AP provides a value specifying the number of omnidirectional SSBs. After an SSB phase at the beginning of the frame, all UEs always have an accurate UE beam for beamforming towards the AP. The availability of the UE beam enables the UE and AP to maintain a basic control connection, even in cases where a complete AP+UE beam pair is not yet available.

Example resources for downlink+uplink common control signaling are described. The UL+DL CCS uses separate time slots for downlink and uplink. However, all users share the DL and UL slots. For uplink transmissions, users are separated, such as in the frequency domain or code domain. Each user is already assigned non-colliding resources before connecting to the sub-THz cell. For downlink reception, no user separation is needed. In some implementations, a code/frequency separation is possible. Specific users can be addressed by respective control information headers in the payload.

Uplink common control signaling enables several functionalities. The UL CCS enables an initial presence indication after the UE has joined AP's cell and after the UE has found the sub-THz SSB and determined a working UE beam. When the AP already has downlink data for the indicated UE, the initial presence indication acts as an initialization signal for the AP to start scheduling for that UE. In some implementations the AP at this time can request a first UL SRS sequence to perform the AP beam sweep. The UL CCS enables buffer status reporting by the UE. Buffer status reporting enables the UE to request suitable uplink scheduling from the AP. The UL CCS enables a UE beam update indication. The UE can perform beam tracking measurements independently of the AP using the omnidirectional SSBs. For scenarios in which mobility is occurring, such as when a user does a rotation, the UE can detect the movement and update its beam as necessary. For example, the UE confirms that (as expected) the neighboring beam becomes the best one, and switches to the neighboring beam when appropriate. In some implementations when the UE detects a significant lateral movement, the UE informs the AP to check whether other beam(s) should be used by the AP, such as neighboring AP beams. In some implementations, the UE selects a completely different UE beam, such as resulting from a different multi path reflection. The UE can signal to the AP an indication that the UE probably needs to find a corresponding new AP beam.

Figure 8:
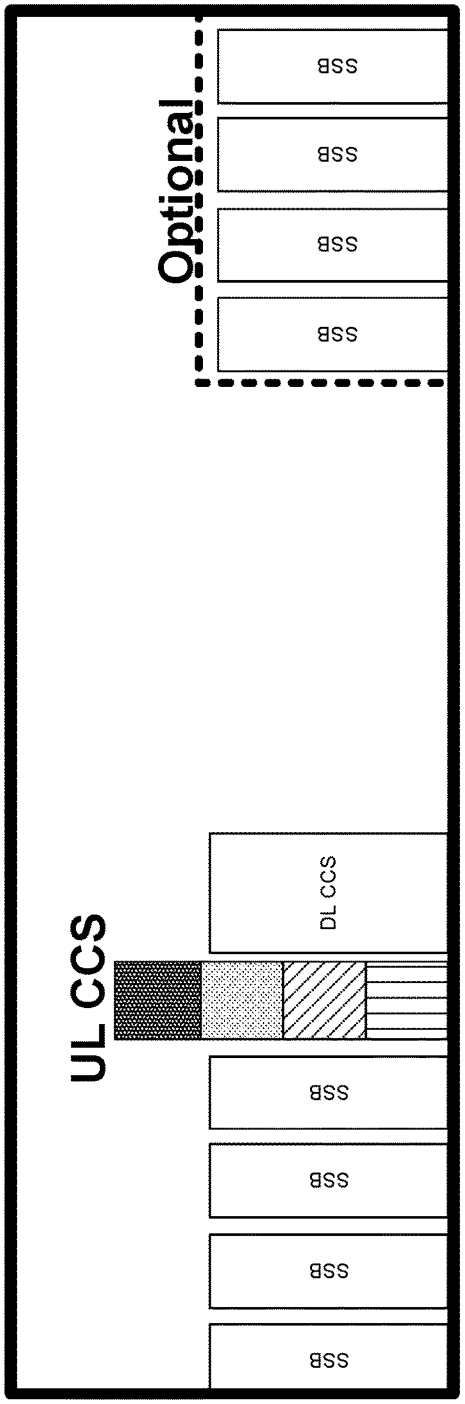
FIG. 8 illustrates an example timing diagram of a frame for a beacon interval for downlink common control signaling (DL CCS).

FIG. 8 illustrates an example timing diagram of a frame 800 for a beacon interval for downlink common control signaling (DL CCS). The DL CCS enables the AP to reach all UEs for general control signaling. The DL CCS serves as a central control slot that is monitored by all UEs so that the UEs can know their respective sleep/wake schedules for the rest of the frame 800. The AP can use the DL CCS for scheduling UE-specific DL and UL data transmissions. For example, individual transmissions from UEs can start with signaling from AP, but using DL CCS signaling, only the intended UEs need to wake up for subsequent data transmission. If a UE is not scheduled, the UE can sleep outside of DL CCS slots. The DL CCS can be used by the AP to indicate dynamic frame format elements to the UEs. In some implementations, the DL CCS could be used to signal further DL CCSs later on in the frame. These additional DL CCSs give another chance to reach all UEs and/or perform additional scheduling before the frame is over. The provisioning of further optional SSBs at the end of the frame 800 helps UEs with their respective beam searches in scenarios in which these resources are not needed for data transmission. Connected UEs can only make use of this feature if they are informed about it, and the DL CCS can provide that information. In addition, UEs that are not yet connected, but which are searching for the system (i.e., searching for SSBs while performing UE Rx sweep), can use these further resources as long as the payload of these additional SSBs makes clear what the time relation is with respect to the frame start. The AP can use the DL CCS to request and configure user-specific UE-beamformed SRS transmissions to allow the AP beam sweep to occur.

Figure 9:
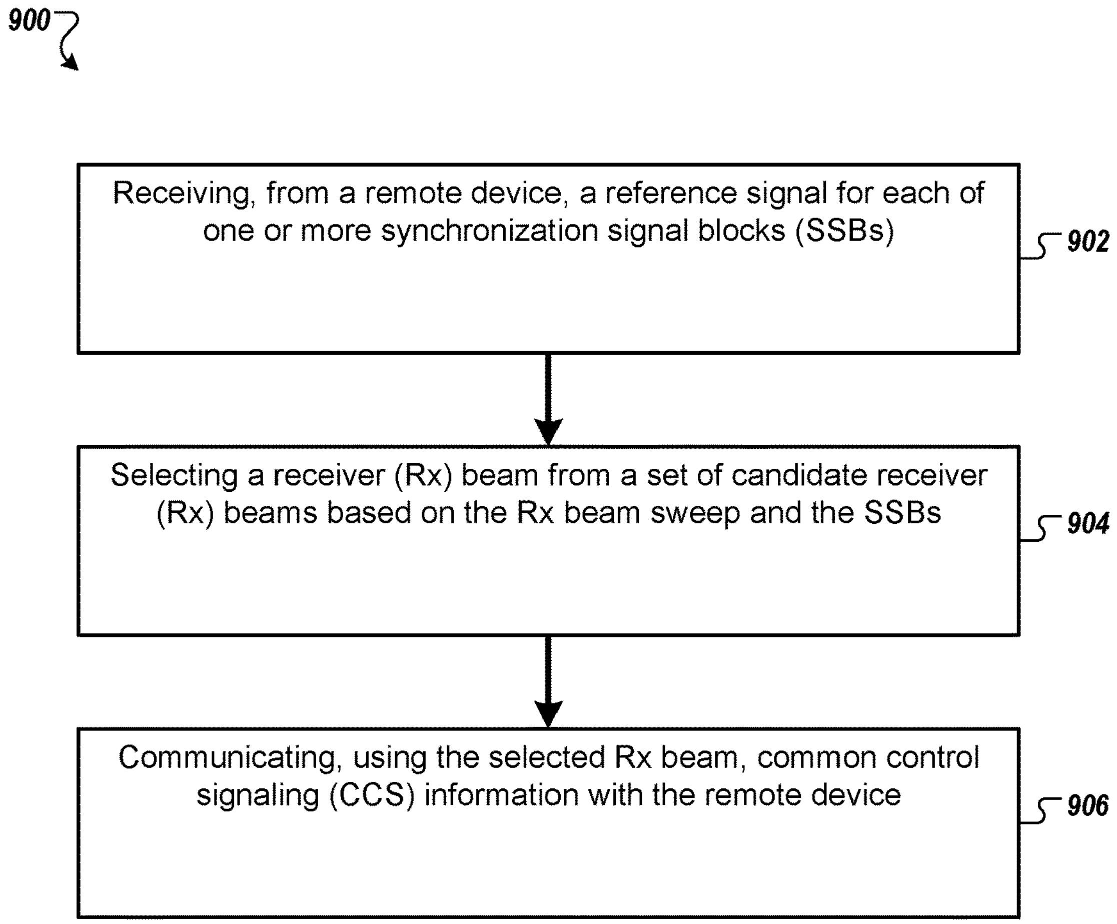
FIG. 9 illustrates a flowchart of an example method, according to some implementations.

FIG. 9 illustrates a flowchart of an example method 900, according to some implementations. For clarity of presentation, the description that follows generally describes method 900 in the context of the other figures in this description. For example, method 900 can be performed by device 110-1 or 110-2 of FIG. 1. It will be understood that method 900 can be performed, for example, by any suitable system, environment, software, hardware, or a combination of systems, environments, software, and hardware, as appropriate. In some implementations, various steps of method 900 can be run in parallel, in combination, in loops, or in any order.

Method 900 includes receiving (902), from a remote device, a reference signal for each of one or more synchronization signal blocks (SSBs). Method 900 includes, based on the receiving, selecting (904) a receiver (Rx) beam from a set of candidate receiver (Rx) beams, the selecting further based on measuring the reference signal with one or more of the candidate Rx beams of the set of the candidate Rx beams. Method 900 includes communicating (906), using the selected Rx beam, common control signaling (CCS) information with the remote device.

The example method 900 shown in FIG. 9 can be modified or reconfigured to include additional, fewer, or different steps (not shown in FIG. 9), which can be performed in the order shown or in a different order. In some implementations, selecting the UE beam occurs prior to the remote device selecting a particular beam for communicating with a user equipment (UE) that is selecting the UE beam. In some implementations communicating, using the selected Rx beam, common control signaling (CCS) information with the remote device comprises transmitting uplink CCS (UL CCS) information to the remote device.

In some implementations, the UL CCS information includes an initial presence indication for a UE for sending to the remote device. In some implementations, the UL CCS information includes buffer status reporting from a UE. In some implementations, the UL CCS information specifies a beam update of a UE, the beam update causing the remote device to perform a beam sweep for further communication with the UE. In some implementations, the UL CCS information specifies lateral movement above a threshold amount for a UE.

In some implementations, communicating, using the selected UE beam, common control signaling (CCS) information with the remote device comprises receiving downlink CCS (DL CCS) information from the remote device. In some implementations, the DL CCS information specifies scheduling for UE-specific DL or UL data transmissions.

In some implementations, the DL CCS information specifies a central control slot monitored by all UEs communicating with the remote device. In some implementations, the DL CCS information specifies a dynamic frame format element comprising an optional SSB.

In some implementations, the remote device is configured for omnidirectional transmission of the reference signal for each of the one or more SSBs.

In some implementations, communicating, using the selected UE beam, common control signaling (CCS) information with the remote device occurs within a small percentage of a frame time of a frame configured for communicating information to the remote device. In some implementations, the frame is 5 milliseconds long.

In some implementations, the one or more SSBs each specify a frame start and frame length from each individual SSB transmission and transmission frequency information for communicating the CCS information with the remote device.

In some implementations, the one or more SSBs each specify an identifier associated with the remote device.

In some implementations, the process 900 includes performing a coarse beam search based on receiving the reference signal for each of one or more synchronization signal blocks (SSBs). In some implementations, the process 900 includes performing a beam recovery based on receiving the reference signal for each of one or more synchronization signal blocks (SSBs). In some implementations, the process 900 includes receiving, from the remote device, a request for a beamformed uplink reference signal (SRS). The process 900 includes sending the SRS responsive to receiving the request. In some implementations, the SRS is transmitted after a downlink CCS and before a listen-before-talk (LBT) period. In some implementations, the SRS is appended to already scheduled uplink data or control signaling.

In some implementations, the remote device includes an access point (AP).

Figure 10:
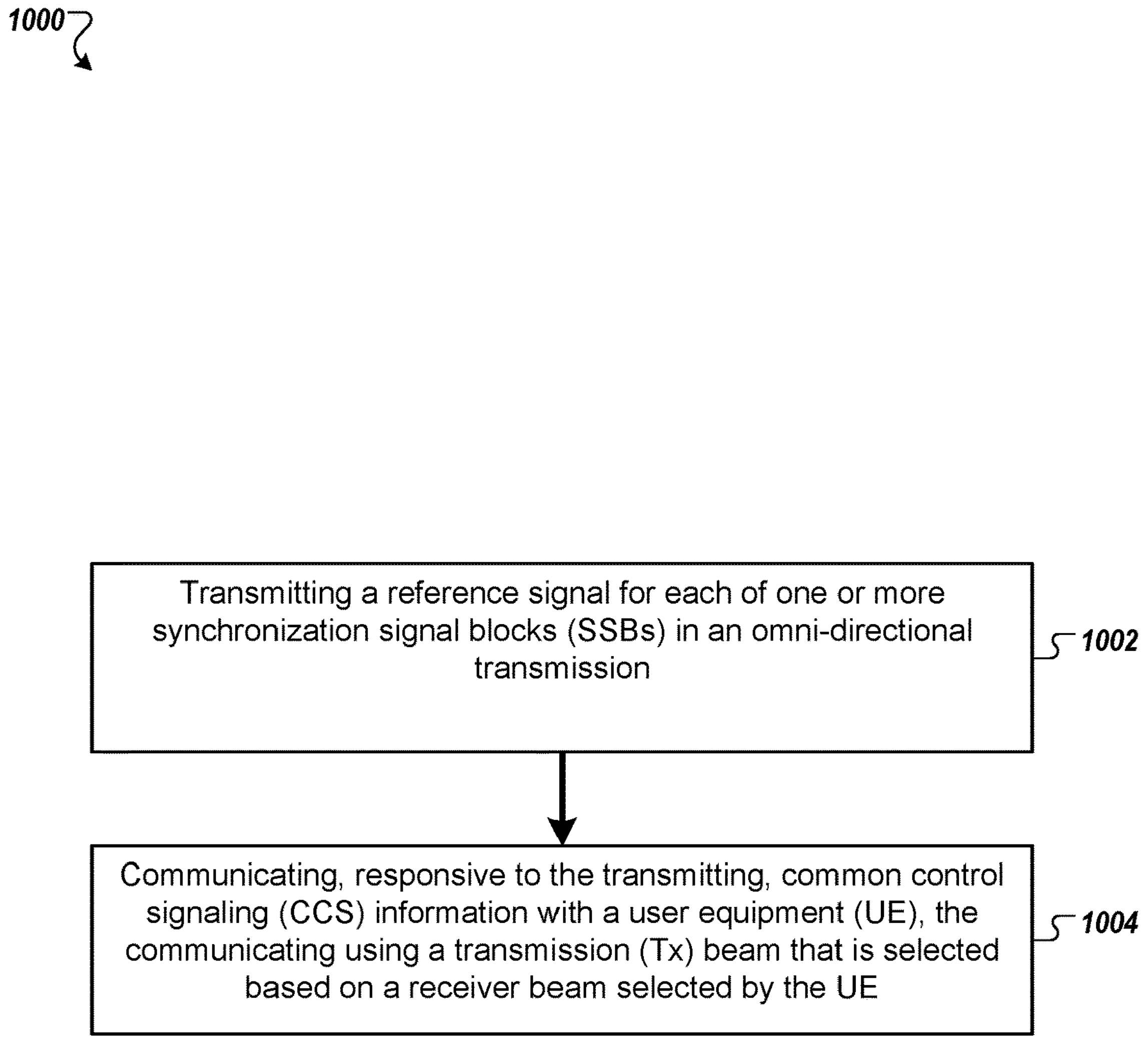
FIG. 10 illustrates a flowchart of an example method, according to some implementations.

FIG. 10 illustrates a flowchart of an example method 1000, according to some implementations. For clarity of presentation, the description that follows generally describes method 1000 in the context of the other figures in this description. For example, method 1000 can be performed by an access point in communication with device 110-1 or

110-2 of FIG. 1, or a base station. It will be understood that method 1000 can be performed, for example, by any suitable system, environment, software, hardware, or a combination of systems, environments, software, and hardware, as appropriate. In some implementations, various steps of method 900 can be run in parallel, in combination, in loops, or in any order.

Process 1000 includes transmitting (1002) a reference signal for each of one or more synchronization signal blocks (SSBs) in an omni-directional transmission including common control signaling (CCS). Process 1000 includes communicating (1004), responsive to the transmitting, information with a user equipment (UE), the communicating using an AP beam that is selected based on a beam selected by the UE.

In some implementations, the process 1000 includes performing uplink (UL) multiple-in-multiple-out (MIMO) channel measurements. In some implementations, the process 1000 includes selecting the AP beam based on the UL MIMO measurements.

In some implementations, the UL CCS control signaling is sent from UE(s) to the AP and received omnidirectionally by the AP. The CCS is transmitted with respective beams by UEs. The UL CCS can be multiplexed into one slot. In some implementations, the UL CCS is multiplexed into one slot, and is multiplexed in the code domain or the frequency domain. The UL SRS are reference signaled transmitted beamformed by UEs. In some implementations, the UL SRS are multiplexed in a frequency domain or in the code domain.

In some implementations, the process 1000 includes receiving, from the UE, information specifying a beam update for the UE beam selected by the UE. In some implementations, the process 1000 includes transmitting a request for an SRS for a new beam sweep or uplink measurement for the UE.

Figure 11:
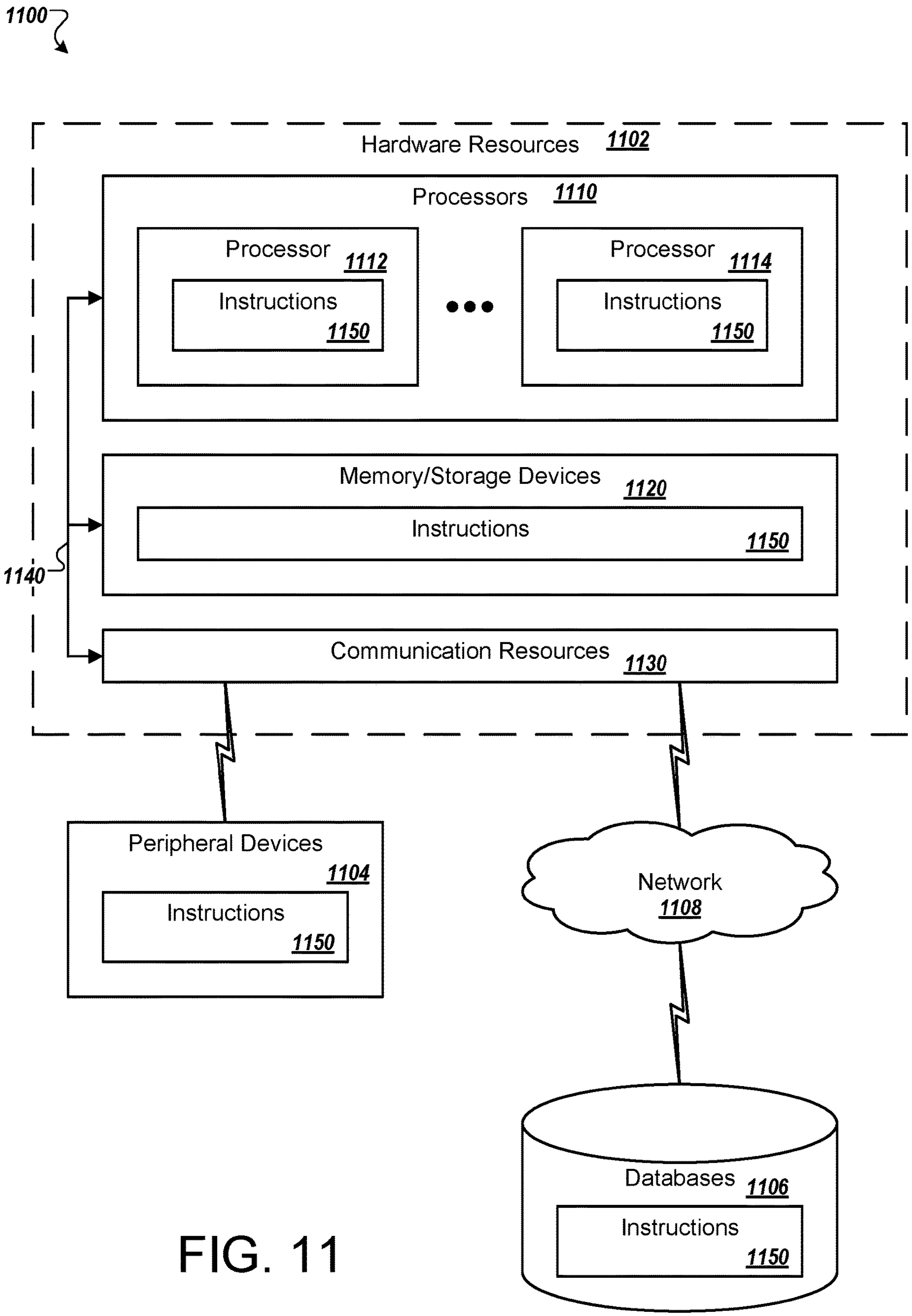
FIG. 11 illustrates a block diagram of an example electronic device, according to some implementations.

FIG. 11 illustrates a block diagram of an electronic device 1100, according to some implementations. The electronic device 1100 can be a cellular telephone, a smartwatch, an access point, a wireless speaker, an Internet-of-Things (IoT) device, among other examples. The electronic device 1100 includes hardware resources 1102 that include one or more processors (or processor cores) 1110, one or more memory/storage devices 1120, and one or more communication resources 1130, each of which can be communicatively coupled via a bus 1140.

The one or more processors 1110 include one or more devices configured to perform computational operations. For example, the one or more processors 1110 can include one or more microprocessors, application-specific integrated circuits (ASICs), microcontrollers, graphics processing units (GPUs), programmable-logic devices, and/or one or more digital signal processors (DSPs). The processors 1110 can include, for example, a processor 1112 and a processor 1114. The processor(s) 1110 can be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1120 can include main memory, disk storage, or any suitable combination thereof. The memory/storage devices 1120 can include, but are not limited to, any type of volatile or nonvolatile memory such as dynamic random-access memory (DRAM), static random-access memory (SRAM), erasable programmable read-only memory (EPROM), electrically erasable programmable read-only memory (EEPROM), Flash memory, solid-state storage, etc. In some implementations, the memory/storage devices 1120 are coupled to one or more high-capacity mass-storage devices (not shown). In some examples, memory/storage devices 1120 can be coupled to a magnetic or optical drive, a solid-state drive, or another type of mass-storage device. In these examples, the memory/storage devices 1120 can be used by electronic device 1100 as fast-access storage for often-used data, while the mass-storage device is used to store less frequently used data.

The communication resources 1130 can include interconnection or network interface components or other suitable devices to communicate with one or more peripheral devices 1104 or one or more databases 1106 via a network 1108. For example, the communication resources 1130 can include wired communication components (e.g., for coupling via USB), cellular communication components, NFC components, Bluetooth® (or Bluetooth® Low Energy) components, Wi-Fi® components, and other communication components.

The communication resources 1130 include one or more devices configured to couple to and communicate on a wired and/or wireless network (i.e., to perform network operations), such as: control logic, one or more interface circuits and a set of antennas (or antenna elements) in an adaptive array that can be selectively turned on and/or off by control logic to create a variety of optional antenna patterns or "beam patterns." Alternatively, instead of the set of antennas, in some examples, electronic device 1100 includes one or more nodes, e.g., a pad or a connector, which can be coupled to the set of antennas. Thus, electronic device 1100 might or might not include the set of antennas. For example, communication resources 1130 can include a Bluetooth™ networking system, a cellular networking system (e.g., a 3G/4G/5G/6G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some implementations, communication resources 1130 includes one or more radios, such as a wake-up radio that is used to receive wake-up frames and wake-up beacons, and a main radio that is used to transmit and/or receive frames or packets during a normal operation mode. The wake-up radio and the main radio can be implemented separately (such as using discrete components or separate integrated circuits) or in a common integrated circuit.

The communication resources 1130 include processors, controllers, radios/antennas, sockets/plugs, and/or other devices used for coupling to, communicating on, and handling data and events for each supported networking system. Note that mechanisms used for coupling to, communicating on, and handling data and events on the network for a network system are sometimes collectively referred to as a "network interface" for the network system.

Instructions 1150 can comprise software, a program, an application, an applet, an app, or other executable code for causing at least any of the processors 1110 to perform any one or more of the methodologies discussed herein. The instructions 1150 can reside, completely or partially, within at least one of the processors 1110 (e.g., within the processor's cache memory), the memory/storage devices 1120, or any suitable combination thereof. In some implementations, any portion of the instructions 1150 can be transferred to the hardware resources 1102 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

While the preceding discussion used a Wi-Fi communication protocol as an illustrative example, in other implementations a wide variety of communication protocols and, more generally, wireless communication techniques can be used. Thus, the communication techniques can be used in a variety of network interfaces. Furthermore, while some of the operations in the preceding implementations were implemented in hardware or software, in general the operations in the preceding implementations can be implemented in a wide variety of configurations and architectures. Therefore, some or all the operations in the preceding implementations can be performed in hardware, in software or a combination of both. For example, at least some of the operations in the communication techniques can be implemented using instructions 1150, operating system (such as a driver for an interface circuit in communication resources 1130) or in firmware in an interface circuit in communication resources 1130. Additionally, or alternatively, at least some of the operations in the communication techniques can be implemented in a physical layer, such as hardware in an interface circuit in communication resources 1130. In some implementations, the communication techniques are implemented, at least in part, in a MAC layer and/or in a physical layer in an interface circuit in communication resources 1130.

While the preceding implementations illustrated the use of wireless signals in one or more bands of frequencies, in some implementations, electromagnetic signals in one or more different frequency bands are used to determine the range. For example, these signals can be communicated in one or more bands of frequencies, including: a microwave frequency band, a radar frequency band, 900 MHZ, 2.4 GHZ, 5 GHZ, 6 GHz, 60 GHz, sub-THz frequency ranges (e.g., 100-300 GHz), and/or a band of frequencies used by a Citizens Broadband Radio Service, by LTE, 5G, or any other communication system.

Although specific components are used to describe electronic device 1100, in some implementations, different components and/or subsystems can be present in electronic device 1100. For example, electronic device 1100 can include one or more additional processing subsystems, memory subsystems, networking subsystems, and/or display subsystems.

Additionally, one or more of the subsystems might not be present in electronic device 1100. In some implementations, electronic device 1100 can include one or more additional subsystems that are not shown in FIG. 11. In some implementations, electronic device can include an analysis subsystem that performs at least some of the operations in the communication techniques. Although separate subsystems are shown in FIG. 11, in some implementations some or all of a given subsystem or component can be integrated into one or more of the other subsystems or component(s) in electronic device 1100.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node that operates in an NR or 5G system (for example, a gNB), and the term "E-UTRAN node" or the like may refer to an access node that operates in an LTE or 4G system (e.g., an eNB). According to various implementations, the access node may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the access node may be implemented as one or more software entities running on server computers as part of a virtual network, which may be referred to as a CRAN and/or a virtual baseband unit pool (vBBUP). In V2X scenarios, the access node may be or act as a "Roadside Unit." The term "Roadside Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Any of the above-described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible considering the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. Personally identifiable information data should be managed and handled to minimize risks of unintentional or unauthorized access or use, and the nature of authorized use should be clearly indicated to users.

What is claimed is:

1. A method comprising:

receiving, from a remote device, a reference signal for each of one or more synchronization signal blocks (SSBs);

responsive to the receiving, selecting a receiver (Rx) beam from a set of candidate receiver (Rx) beams, the selecting being based on a sweep of the candidate Rx beams and on measuring the reference signal with one or more of the candidate Rx beams of the set of the candidate Rx beams; and communicating, using the selected Rx beam, an element of common control signaling (CCS) information to the remote device.

2. The method of claim 1, wherein selecting the Rx beam occurs prior to the remote device selecting a local beam for transmitting information.

3. The method of claim 1, wherein communicating, using the selected beam, the element of CCS information with the remote device comprises transmitting an element of uplink CCS (UL CCS) information to the remote device.

4. The method of claim 3, wherein the element of UL CCS information comprises an initial presence indication for a user equipment (UE) or a buffer status report associated with a UE.

5. The method of claim 3, wherein the element of UL CCS information specifies a beam update or wherein the element of the UL CCS information specifies a lateral movement that exceeds a threshold, causing the remote device to perform a beam sweep prior to further communication with a UE.

6. The method of claim 1, wherein communicating, using the selected Rx beam, the element of CCS information with the remote device comprises receiving an element of downlink CCS (DL CCS) information from the remote device.

7. The method of claim 6, wherein the element of DL CCS information indicates scheduling for a UE-specific DL or UL data transmission, a common control slot monitored by all UEs communicating with the remote device, or a dynamic frame format element comprising an optional SSB.

8. The method of claim 1, wherein the one or more SSBs each specify a frame start and frame length from each individual SSB transmission and transmission frequency information for communicating the CCS information with the remote device.

9. The method of claim 1, wherein the one or more SSBs each specify an identifier associated with the remote device.

10. The method of claim 1, wherein the reference signal comprises an omnidirectional signal for each of the one or more SSBs.

11. The method of claim 1, further comprising:

performing a coarse beam search based on receiving the reference signal for at least one or more synchronization signal blocks (SSBs).

12. The method of claim 1, further comprising:

performing a beam recovery based on receiving the reference signal for each of one or more synchronization signal blocks (SSBs).

13. The method of claim 1, further comprising:

receiving, from the remote device, a request for a sounding reference signal (SRS); and sending the SRS responsive to receiving the request.

14. The method of claim 1, wherein an SRS is transmitted after a DL CCS and before a listen-before-talk (LBT) period.

15. The method of claim 1, wherein an SRS is appended to already scheduled uplink data or control signaling.

16. An apparatus comprising one or more processors, a set of antennas, and a memory storing instructions to cause the set of antennas and the one or more processors to perform operations comprising:

transmitting a reference signal for each of one or more synchronization signal blocks (SSBs) in an omni-directional transmission;

communicating, responsive to the transmitting, common control signaling (CCS) information with a user equipment (UE), the communicating using a first beam that is selected based on a second beam selected by the UE;

receiving, from the UE, information specifying a beam update for the first beam; and transmitting a request for a sounding reference signal (SRS) for a beam sweep or uplink measurement associated with the UE.

17. The apparatus of claim 16, the operations further comprising performing uplink (UL) multiple-in-multiple-out (MIMO) channel measurements; and selecting the beam based on the UL MIMO measurements.

18. The apparatus of claim 16, further comprising receiving multiplexed sounding reference signals (SRSs), the multiplexing occurring in a time domain or a code domain; and communicating with multiple UEs based on the multiplexed SRS.

19. One or more baseband processors configured to perform operations comprising:

receiving, from a remote device, a reference signal for each of one or more synchronization signal blocks (SSBs);

responsive to the receiving, selecting a receiver (Rx) beam from a set of candidate receiver (Rx) beams, the selecting being based on a sweep of the candidate Rx beams and on measuring the reference signal with one or more of the candidate Rx beams of the set of the candidate Rx beams; and communicating, using the selected Rx beam, an element of common control signaling (CCS) information to the remote device.

* * * * *